United States Patent
Akyol et al.

(10) Patent No.: US 7,813,337 B2
(45) Date of Patent: Oct. 12, 2010

(54) NETWORK PACKET PROCESSING USING MULTI-STAGE CLASSIFICATION

(75) Inventors: Bora Akyol, San Jose, CA (US); Puneet Agarwal, Cupertino, CA (US); Brian Baird, San Ramon, CA (US); Venkateshwar Buduma, San Jose, CA (US); Mohan Kalkunte, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 329 days.

(21) Appl. No.: 11/711,984

(22) Filed: Feb. 28, 2007

(65) Prior Publication Data

US 2008/0205403 A1    Aug. 28, 2008

Related U.S. Application Data

(60) Provisional application No. 60/881,253, filed on Jan. 19, 2007.

(51) Int. Cl.
*H04L 12/50* (2006.01)
*H04Q 11/00* (2006.01)
*H04L 12/28* (2006.01)
*H04L 12/56* (2006.01)

(52) U.S. Cl. .................. 370/388; 370/392; 370/395.31

(58) Field of Classification Search ........................ None
See application file for complete search history.

(56) References Cited

U.S. PATENT DOCUMENTS

| | | | | |
|---|---|---|---|---|
| 6,529,508 | B1 * | 3/2003 | Li et al. | 370/392 |
| 7,002,965 | B1 * | 2/2006 | Cheriton | 370/395.32 |
| 7,095,742 | B2 * | 8/2006 | Kaganoi et al. | 370/392 |
| 7,512,122 | B1 * | 3/2009 | Olakangil et al. | 370/389 |
| 2003/0161303 | A1 * | 8/2003 | Mehrvar et al. | 370/386 |
| 2005/0083935 | A1 * | 4/2005 | Kounavis et al. | 370/392 |
| 2007/0280245 | A1 * | 12/2007 | Rosberg | 370/392 |

* cited by examiner

*Primary Examiner*—Chirag G Shah
*Assistant Examiner*—Ashley L Shivers
(74) *Attorney, Agent, or Firm*—Brake Hughes Bellermann LLP

(57) ABSTRACT

Methods and systems for processing packets in data network using multistage classification are disclosed. An example method for processing packets includes receiving a data packet at a first processing stage and examining the packet at the first processing stage to determine a first attribute of the packet. Based on the first attribute, a first classification is assigned to the packet. In the example method, the packet and the first classification are communicated from the first processing stage to a second processing stage and the packet is examined at the second processing stage to determine a second attribute of the packet. Based on the second attribute, a second classification is assigned to the packet. The example method further includes processing the packet based on the first classification and the second classification.

20 Claims, 5 Drawing Sheets

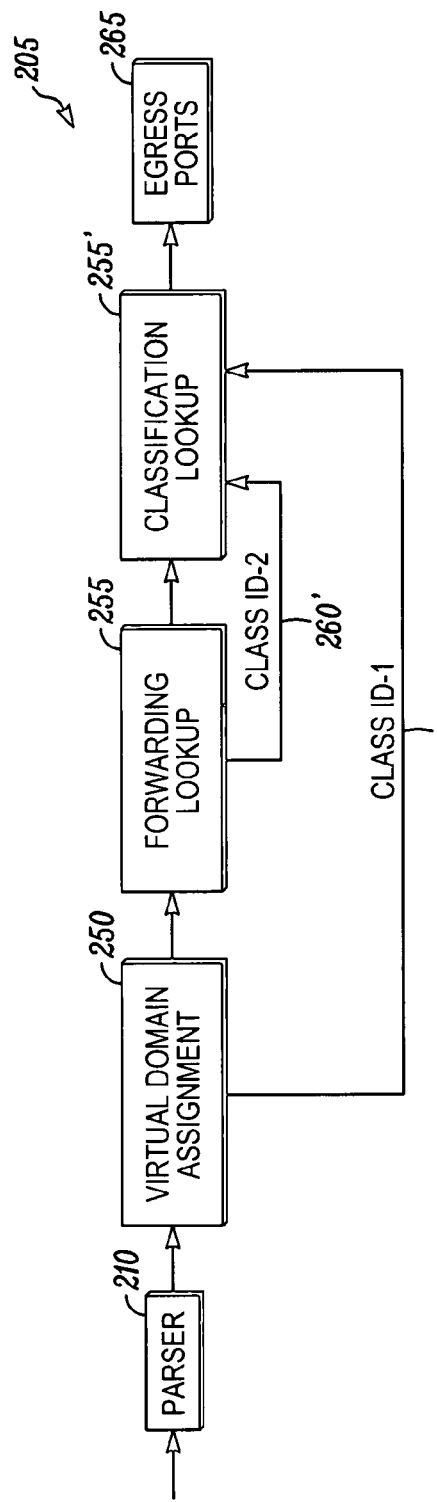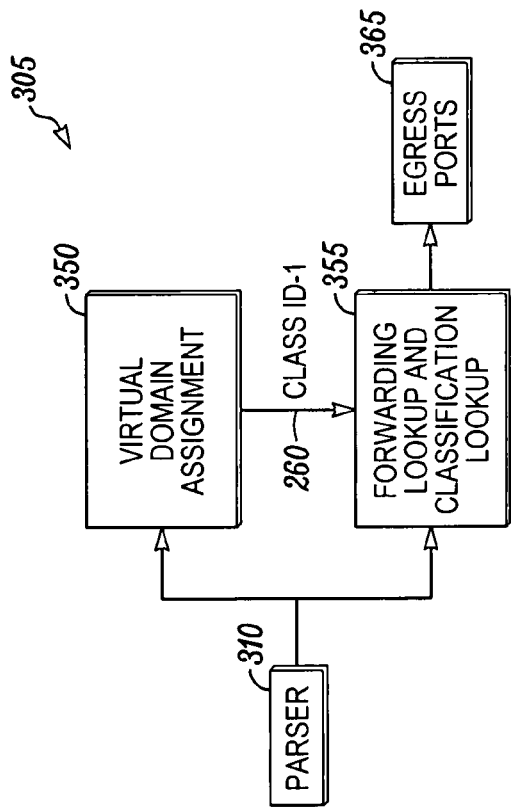

TCAM 400

| SOURCE ATTRIBUTE | CLASS ID-1 |
|---|---|
| SRC-1 | A |
| ⋮ | ⋮ |
| SRC-M | A |
| SRC-101 | B |
| ⋮ | ⋮ |
| SRC-Q | B |

| DESTINATION ATTRIBUTE | CLASS ID-2 |
|---|---|
| DST-1 | C |
| DST-2 | D |

| CLASS ID-1 | CLASS ID-2 | RULE |
|---|---|---|
| A | C | ALLOW |
| A | D | DROP |
| B | C | REROUTE |
| B | D | ALLOW |

| SOURCE | DESTINATION | RULE |
|---|---|---|
| SRC-1 | CLASS D | ALLOW |

*FIG. 4D*

NETWORK PACKET PROCESSING USING MULTI-STAGE CLASSIFICATION

CROSS REFERENCE TO RELATED APPLICATIONS

This application claims the benefit under 35 U.S.C. §119 (e) of U.S. Provisional Patent Application Ser. No. 60/881, 253, filed on Jan. 19, 2007. The entire disclosure of U.S. Provisional Application Ser. No. 60/881,253 is incorporated by reference herein in its entirety.

TECHNICAL FIELD

This description relates to processing of packets in a data network.

BACKGROUND

In packet data networks, such as Ethernet networks, policy-based network security may be implemented by defining different sets or groups of users and applying different sets of rules governing network security to the users of each set. Current approaches for implementing network security in such networks include defining the sets of users and applying the sets of rules using a classification module. Such classification modules include a lookup table implemented in a memory structure that is used to determine what rules to apply to the different sets of users.

In current approaches, each rule has a corresponding entry for each user to which the particular rule applies. By way of simple example, in a data network with ten users (e.g., in one particular group) and ten rules that are to be applied to those ten users, the lookup table would include one-hundred entries, i.e., one entry for each user for each rule. Accordingly, the number of entries needed in such a classification module is the product of the number of users (M) and the number of rules (N) to be applied to data packets associated with (i.e., communicated to or from) the M users. Therefore, using such an approach, the number of rules equals approximately M*N.

As the complexity of data networks, such as corporate networks, increases and the number of users and rules (e.g., policy-based rules) applied to those users increases, the size of a lookup table that is required in a classification module to implement such rules can become excessively large. For instance, in a network with 500 users and 100 rules that are applied to each of those 500 users, the lookup table in such a classification module would include approximately 50,000 entries. Of course, other groups of users (e.g., a group of W users) and other sets of rules (e.g., a set of X rules applied to the W users) could also be implemented, thus further increasing the number of entries needed in the lookup table (i.e., by W*X in this example, resulting in M*N+W*X rules or entries).

Because such lookup tables are typically implemented using content-addressable memory, which is costly to implement (e.g., in terms of design effort and in terms of the semiconductor area used in integrated circuit embodiments), using such classification techniques can result in undue product design and manufacturing costs.

SUMMARY

According to one general aspect, an example method for processing packets may include receiving a data packet at a first processing stage and examining the packet at the first processing stage to determine a first attribute of the packet. Based on the first attribute, a first classification may be assigned to the packet. In the example method, the packet and the first classification may be communicated from the first processing stage to a second processing stage and the packet is examined at the second processing stage to determine a second attribute of the packet. Alternatively, the packet may be communicated to the second stage from the network in parallel with the first stage, e.g., via a packet parser. Based on the second attribute, a second classification is assigned to the packet. The example method further includes processing the packet based on the first classification and the second classification.

According to another general aspect, an example data network packet switch may include a first packet processing stage and a second packet processing stage that is operatively coupled with the first processing stage. In the example switch, the first processing stage may be adapted to receive a data packet from a data network and examine the packet to determine a first attribute of the packet. In the example switch, a first classification value may be assigned based on the first attribute. The first processing stage may be further adapted to communicate the packet and the first classification to the second processing stage.

The second processing stage in the example switch may be adapted to receive the packet in parallel with the first processing stage or from the first processing stage. The second processing stage may be further adapted to receive the first classification from the first processing stage and examine the packet to determine a second attribute of the packet. A second classification may be assigned based on the second attribute. The second processing stage may be still further adapted to process the packet based on the first classification and the second classification.

According to another general aspect, an example Ethernet data packet switch may include a first packet processing stage. The first packet processing stage may include a first content-addressable memory (CAM) that implements a first lookup table. The first lookup table may associate a first set of packet attributes with a first set of respective classes. The example Ethernet switch may also include a second packet processing stage including a second CAM. The second CAM may implement a second lookup table, the second lookup table associating a second set of packet attributes with a second set of respective classes.

In the example Ethernet switch, the first processing stage may be adapted to receive a data packet from a data network and examine the packet to determine a first attribute of the packet, where the first attribute is one of the first set of packet attributes. The example Ethernet switch may assign a first classification from the first set of classes based on the first attribute. The example Ethernet switch may be further adapted to communicate the packet and the first classification to the second processing stage.

In the example Ethernet switch, the second processing stage may be adapted to receive the packet from either the first processing stage or the data network. The second processing stage may also be adapted to receive the first classification from the first processing stage and examine the packet to determine a second attribute of the packet, where the second attribute is one of the second set of packet attributes. In the example Ethernet switch, the second processing stage may be further adapted to assign a second classification based on the second attribute and process the packet based on the first classification, the second classification and a set of packet processing rules.

The details of one or more example implementations are set forth in the accompanying drawings and the description

BRIEF DESCRIPTION OF THE DRAWINGS

FIG. 2 is a block diagram of an example embodiment of a switch, such as the switch illustrated in FIG. 1, where the switch includes a multistage classifier.

FIG. 3 is a block diagram of another example embodiment of a switch that includes a multistage classifier.

FIGS. 4A-4D are diagrams of example lookup tables that may be implemented in the switches of FIGS. 1-3 for use in performing multistage classification.

DETAILED DESCRIPTION

Figure 1:
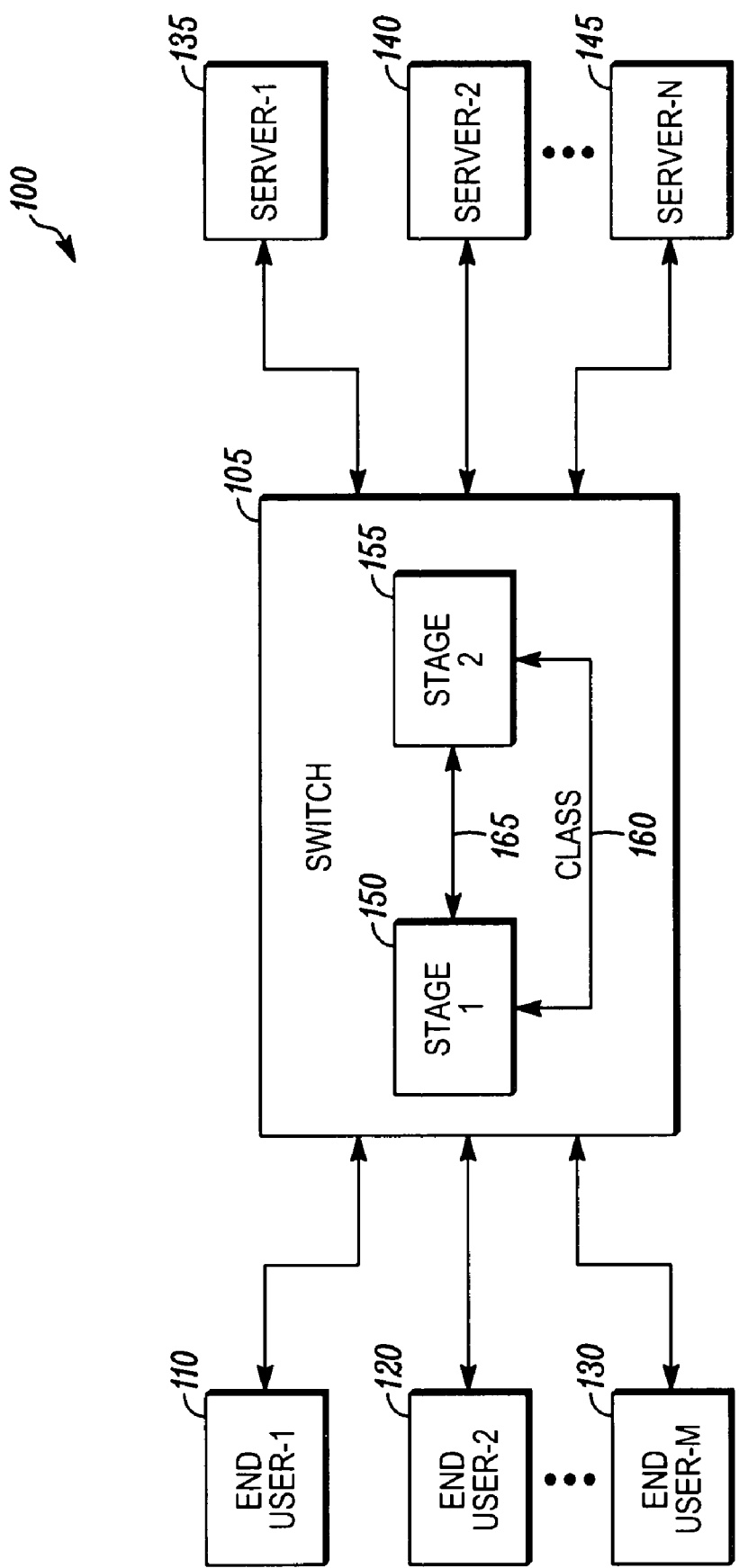
FIG. 1 is a block diagram of a data network in which multistage classification may be implemented.

FIG. 1 is a block diagram of a data network 100, which may be used to implement multistage classification. The data network 100 is provided by way of example and any number of other network configurations is possible. The network 100 may be a policy-based Ethernet network, an Internet Protocol network, or any other appropriate type of packet-based or communication network, such as a cellular telephone network. Furthermore, the network 100 may include other elements not shown in FIG. 1, such as routers, additional switches, among any number of other possible network devices. Additionally, certain elements in the network 100 may be eliminated, such as specific end user devices or servers.

The network 100 includes a packet switch 105, which may be used to implement multistage classification. Depending on the particular embodiment, multistage classification may be implemented in other network entities or nodes, such as routers, bridges, servers, or any other device on a network that sends and/or receives packet data traffic. The network 100 also includes end user devices END USER-1 110, END USER-2 120 and END USER-M 130, which are operationally coupled with the switch 105. The network 100 also includes servers SERVER-1 135, SERVER-2 140 and SERVER-N 145, which are also operationally coupled with the switch 105.

The switch 105 may be used to implement network security for data communications in the network 100. For purposes of this example, it will be assumed that there are one-hundred end user devices (i.e., M=100) and fifty servers (i.e., N=50). It is also assumed, for this example, that all one-hundred end user devices belong to a single class of users (e.g., contract employees) and that all fifty servers belong to a single class of servers (e.g., accounting servers).

Of course, other arrangements are possible. For example, among numerous other possibilities, the one-hundred end user devices may be separated into multiple user classes where individual end user devices may belong to more than one class. Likewise, the fifty servers may be separated into multiple classes using any number of other possible arrangements. The simple assumptions stated above are used here for purposes of clarity and illustration.

For the example network 100, using the above assumptions, a security policy (e.g., rules) may be enforced using a classification module to determine how data traffic between the end user devices and the servers should be processed. Such a classification device may be implemented using hardware in combination with software and/or firmware. For instance, if contract employees are generally not allowed to access data that is located on, originates with, or passes through accounting servers, a classification module may be used to appropriately classify data traffic between a contract employee and an accounting server so that data packets in such a data traffic stream are dropped (e.g., in the switch). Using current approaches, the classification module would include one rule (e.g., one entry in a lookup table) per end user device, per server indicating that such traffic should be dropped. For this example, such an approach would require 5,000 lookup table entries (i.e., M*N=100*50). Adding additional end user devices, servers, or rules would further increase the number of lookup table entries. While bit masks may be used in certain applications, such an approach does not apply well to addresses that are not assigned hierarchically, such as MAC addresses and Ethernet addresses.

It will be appreciated that such rules may be implemented in any number of manners. For instance, the rules need not be implemented on a per physical device basis (e.g., implemented end user device and/or per server), but may, for example, be implemented based on the identification of a user that is using a network device that is sending data traffic to the network entity performing the multistage classification. The identity of the user may be determined during an authentication process (e.g., a login process). As part of the login process, lookup tables used to implement multistage classification may be updated to reflect that the user is logged into the network and also to identify the network device on which the user is logged in. Multistage classification may then be applied to packets originating from and/or destined for the network device that the user is accessing the network with.

The switch 105 in FIG. 1 may be used to implement multistage classification of data packets. Such multistage classification may result in a significant reduction in the number of lookup table entries used to implement a set of security rules (or other network policies). For instance, the switch 105 can include a first packet processing stage 150 (STAGE 1) and a second packet processing stage 155 (STAGE 2). Each of the stages 150 and 155 may include a classification module including a corresponding lookup table. As discussed above, the lookup tables of stages 150 and 155 may be implemented using content-addressable memory (CAM) structures. Depending on the particular embodiments, such lookup tables may be implemented using ternary CAM (TCAM) structures.

CAMs are computer memory structures that may be used for high speed searching applications, such as lookup tables. A CAM may also be referred to as an associative memory, associative storage, or an associative array. CAMs are typically designed such that when a data word is supplied to the CAM, the CAM searches its entire memory to see if the supplied data word is stored anywhere in the CAM. If the data word is found, the CAM may return a list of one or more storage addresses where the supplied data word was found. Depending on the particular design, the CAM may return the supplied data word along with associated pieces of data (i.e., the CAM may operate as a lookup table). Binary CAMs only support searching on data words composed of digital "1s" and "0s." TCAMs are content addressable memory structures that allow for masking individual bits of information for data fields being compared to, looked up, or stored in the TCAM (i.e., they provide for a don't care "X" state). While more complicated to implement than binary CAMs, TCAMs allow for increased flexibility when used to implement lookup tables.

For purposes of this disclosure, the example embodiments are described with respect to data directed from an end user device in FIG. 1 to a server of the network 100. However, it will be appreciated that the techniques described herein may be used to apply network policies (e.g., network security rules) not only to data traffic flowing from the end user devices to the servers, but to data traffic flowing from the servers to the end user devices, via the switch 105, as well.

In the network 100, a data packet (e.g., an Ethernet packet) may be received from the data network (e.g., from an end user) at the first packet processing stage 150. The first stage 150 examines the packet to determine an attribute of the packet. When examining the packet, the first stage 150 may examine the packet header to determine any number of attributes of the packet, such as a Media Access Control (MAC) layer source address, an IP source address, or a Virtual LAN (VLAN) tag, among any number of other attributes, such as a Multicast Group ID.

As an alternative, the first stage 150 may examine the packet to determine the port of the switch 105 on which the packet was received. Such an approach may be useful for embodiments of the network 100 that are physically or virtually partitioned (e.g., in which all data traffic for certain classes of users is communicated via specific physical or virtual ports of the switch 105). In such situations, the first classification may be based on the port on which it was received, thus eliminating examination of the packet header from the first stage of the classification process.

After the first stage 150 determines the first attribute of the packet, the first stage 150 may then use the first attribute as a lookup value for accessing a lookup table (e.g., TCAM) in the first stage. For instance, if the attribute determined by the first stage 150 is a MAC source address of an end user device, the first stage may "lookup" the MAC source address in the lookup table to determine a first classification for the packet. In this example, the lookup operation would produce a result indicating that the MAC source address corresponds to an end user device that corresponds with a device that is used by a contract employee. For the network 100 in this example, the lookup table of the first stage 150 would have 100 entries, one for each of the M contract employees. The first stage 150 then may assign a first classification designator to the packet indicating that the packet is associated with (e.g., was sent by) a contract employee.

The first stage 150 may then communicate the first classification to the second stage 155 via signal line(s) 160 for second-stage classification. Further, the first stage 150 may also communicate the data packet to the second stage 155 via signal line(s) 165. Alternatively, the packet may be communicated to the second stage 155 in parallel with the first stage 150 (e.g., directly from the data network or other entity in the switch 105, such as a parser). In such an approach, which is discussed further below with reference to FIG. 3, the first classification lookup may be performed in parallel with a second classification lookup. Such an approach may improve the performance of the switch (e.g., the amount of time to process a packet in the switch 105).

After receiving the packet, the second stage 155 examines the packet to determine a second attribute of the packet. In like fashion as discussed above with respect to the first stage 150, the second stage 155 may examine the packet header to determine any number of attributes of the packet, such as a MAC destination address or an IP destination address, among other attributes. As with the first stage 150, the second stage 155 may, as an alternative, examine the packet to determine information about the packet that is not included in the packet header. For example, the second stage 155 may determine which egress port the packet is to be forwarded through. As discussed above, such an approach may be useful for embodiments of the network 100 that are physically or virtually partitioned.

After the second stage 155 determines the second attribute of the packet, the second stage 155 may then use the second attribute as a lookup value for accessing a lookup table (e.g., stored in a TCAM) in the second stage. For instance, if the attribute determined by the second stage 155 is a MAC destination address corresponding with an accounting server in the network 100, the second stage may "lookup" the MAC destination address in the lookup table to determine a second classification for the packet. In this example, the lookup operation would produce a result indicating that the MAC destination address corresponds to an accounting server. For the network of FIG. 1, the lookup table of the second stage 155 would have 50 entries, one for each of the N accounting servers. The second stage 155 may then assign a second classification designator to the packet indicating that the packet is associated with (e.g., being communicated to) an accounting server.

After assigning the second classification designator to the packet using the second stage 155 and receiving the first classification designator from the first stage 150, the switch 105 may then process the packet based on the first classification and the second classification. In this example, because contract employees are not allowed to access accounting servers a single rule (i.e., a single CAM entry) may be used to indicate that packets having a first classification designator indicating that the packet is associated with a contract employee and a second classification designator indicating that the packet is destined for an accounting server should be dropped.

Using the multistage classification technique described above, the number of lookup table entries (e.g., TCAM entries) used to implement a rule to disallow contract employees access to accounting servers can be on the order of M+N+1, where M is the number of contractors (100), N is the number of account servers (50) and 1 is the entry for the rule itself to instruct the switch 105 to drop such packets. Accordingly, the number of CAM entries using such an approach, for this example, is 151. This represents a significant reduction from the 5,000 entries used in a single stage classification approach.

In other embodiments, the rules may indicate that packets are to be sent to the destination address. For instance, a rule may be implemented to allow all employees of a class "accounting" to have access to the accounting servers. Such a rule may be implemented in a similar fashion as described above. In still other embodiments, rules may be implemented to redirect certain packets to an address other than the destination address. Such an approach may be useful to apply to packets (and associated data streams) that may represent a security hazard, such as packets carrying viruses or spyware, for example. Such packets may be routed to a network administration server, where they may be quarantined for later examination by a network administration employee or where they may be examined by security software applications, such as anti-virus software, for example.

Depending on the particular embodiment, packet processing rules may be implemented in the second stage 155. For example, rules may be implemented in same lookup table (e.g. stored in the TCAM) used to associate the second attribute with the second classification designator. Alternatively, the rules may be implemented in a separate packet processing stage that includes a dedicated lookup table. Implementing the rules as part of the second stage 155 or in a separate stage should not adversely affect (e.g., increase) the number of lookup table entries used for a particular embodiment. The particular approach used may depend on implementation choices and design preferences.

Also, in certain embodiments, the packet processing rules may include exceptions. For instance, an exception may be applied in the above example for a contract employee that is assigned to the accounting department. In this situation, it is desirable that this particular contract employee have access to the accounting servers. Therefore, a rule may be implemented as an exception to the rule discussed above to allow the accounting contract employee to access the accounting server. For instance, a rule may be implemented that indicates packets with a MAC source address associated with the accounting contractor should be allowed to reach the accounting servers. In such an approach, rules for specific end user devices may take precedence over rules for classes of end user devices (e.g., the switch 105 may use a rule hierarchy when processing packets). A single rule may be used to implement such an exception, such as is described in further detail below with respect to FIG. 4D.

Such a multistage classification approach may also provide other benefits. For instance, using such an approach may reduce the time needed to update and/or modify the lookup tables used for multistage classification when adding or removing devices on the network or when a new user accesses the network. For example, adding one regular contract employee (who should not have access to accounting servers) may be accomplished by merely adding a single entry in the lookup table of the stage 150. Using a single stage classifier would require on the order of 50 entries, one for each accounting server, for example.

FIG. 2 is a block diagram illustrating a more detailed example embodiment of a packet switch 205 that may be used to implement multistage classification in a data network, such as the network 100 illustrated in FIG. 1. The switch 205 may operate, for example, in a policy-based Ethernet network that supports virtual domains. In FIG. 2, analogous elements to the elements of FIG. 1 have been referenced with like 200 series reference numbers as the 100 series numbers used in FIG. 1.

The switch 205 of FIG. 2 can include a parser 210, a virtual domain assignment (VDA) module 250, a forwarding lookup module 255 and a classification lookup module 255'. The parser 210 may receive packets from the data network and separate the packets into their constituent parts, such as various headers (Ethernet header, IP header, etc.) for associated communication protocol layers, (e.g., L2, L3, etc.) and a packet payload, for example. For the switch 205, the VDA module 250 may operate as the first packet processing stage, while the forwarding lookup module 255 may operate as the second packet processing stage, such as in the fashion described above. In such an approach, the first and second classification designators may be determined along with lookups that are already being made by the VDA module 250 and the forwarding lookup module 255 to perform other operations, such as assigning a VLAN tag based on a packet's MAC source address, or determining an egress port for a packet based on its MAC destination address.

As was discussed above, the classification lookup module 255' (which may include the lookup table implementing the packet processing rules) may be included in the same structure as the forwarding lookup module 255 (e.g., using a shared TCAM) or may be implemented as a separate entity, as illustrated in FIG. 2. Again, the particular approach used may depend on a number of things, such as the particular embodiment and associated design considerations.

In the switch 205, the first classification designator (CLASS ID-1) may be communicated from the VDA module 250 to the classification lookup module 255' via signal line(s) 260. Likewise, the second classification designator (CLASS ID-2) may be communicated from the forwarding lookup module 255 to the classification lookup module 255' via the signal line(s) 260'.

The switch 205 can further include egress ports 265 that may be used to forward packets that have been processed by the switch 205 (or buffer packets that are waiting to be forwarded) based on the packet processing rules implemented by the classification lookup 255'. For instance, the egress ports 265 may forward packets to their destination address as indicated in their packet header or may forward the packets to another address based on the application of a packet processing rule, such as discussed above. When packets are to be dropped in the switch 205 in accordance with the packet processing rules, they may be dropped in the classification lookup module 255' once it is determined that the packets will not be sent to their destination address due to a security rule violation.

FIG. 3 is a block diagram of an alternative example packet switch 305. As with FIG. 2, the elements of FIG. 3 that are analogous with the elements of FIG. 1 are referenced with like 300 series reference numbers as the 100 series numbers in FIG. 1. The arrangements shown for the packet switches 205 and 305 are given by way of example and any number of other arrangements is possible.

The switch 305 includes a parser 310 that may operate in substantially the same fashion as the parser 210 in the switch 205, which was described above with respect to FIG. 2. The switch 305 also includes a VDA module 350 and a forwarding lookup and classification lookup module 355. As was described above as a possible alternative to the switch arrangement of FIG. 2, the forwarding lookup and classification lookup module 355 of the switch 305 combines the functions of the forwarding lookup module 255 and the classification lookup module 255' of FIG. 2.

In the switch 305, the VDA module 350 and the forwarding lookup and classification module 355 can be arranged in parallel, rather than being coupled in a serial fashion, as with the switch 205. Such an approach may be advantageous as it may reduce the overall packet processing time for the switch 305. Such reductions may be realized as a result of the VDA module 350 and the forwarding lookup and classification module 355 performing their lookups in parallel. Also, the VDA module 350 may only receive the packet information needed to determine the VDA and assign the first classification designator. Accordingly, it is possible to only provide the VDA module 350 with the packer header, or portions of the header.

After determining the first classification designator (CLASS ID-1), such as in the fashion described above, the VDA module 350 may provide the first class designator to the forwarding lookup and classification module 355. Once the forwarding lookup and classification module 355 has determined the second classification designator, such as described above, and received the first designator from the VDA module 350, the forwarding lookup and classification module 355 may then perform a classification lookup to determine what packet processing rules (or rule exceptions) should be applied to the packet.

After the forwarding lookup and classification module 355 has performed the classification lookup, the packet processing may then be completed in accordance with the applicable packet processing rules or exceptions. For example, the packet may be dropped by the forwarding lookup and classification module 355, may be sent to the egress ports 365 to be forwarded to its destination address, or may be sent to the egress ports 365 to be forwarded to another address (other than the destination address), such as for packets that may pose a network security concern. Such packets may be packets that include IP addresses that are not included in the routing tables of the network, which may indicate that the IP address is "spoofed" and that the packet payload may contain malicious material, such as a virus or a "worm."

FIGS. 4A-4D are diagrams illustrating example embodiments of lookup tables that may be used to implement multistage classification, such as described above. FIG. 4A illustrates an example embodiment of a lookup table 400 that may be implemented in a TCAM 405, as was described above. The lookup table 400 may implement the lookup table of the first stage 150 of FIG. 1, the lookup table of the VDA module 250 of FIG. 2, or the lookup table of the VDA module 350 of FIG. 3. FIG. 4B illustrates an example embodiment of a lookup table 410 that may be implemented as part of the lookup table of the second stage 155 of FIG. 1, as the lookup table of the forwarding lookup module 255 of FIG. 2, or as part of the lookup table of the forwarding lookup and classification lookup module 355 of FIG. 3. FIG. 4C illustrates a classification lookup table 420 that may be implemented as part of the lookup table of the second stage 155 of FIG. 1, as the lookup table of the classification lookup module 255' of FIG. 2, or as part of the lookup table of the forwarding lookup and classification lookup module 355 of FIG. 3. FIG. 4D illustrates an example embodiment of a lookup table 430 for rule exceptions that may be implemented as part of the lookup table of the second stage 155 of FIG. 1, as part of the lookup table of the classification lookup module 255' of FIG. 2, or as part of the lookup table of the forwarding lookup and classification lookup module 355 of FIG. 3. As previously discussed, any number of arrangements for the lookup tables may be used and the foregoing are merely examples.

The table 400 illustrated in FIG. 4A may be used for assigning a first classification designator, such as in the fashion described above. The table 400 includes, in the left column, source attributes for end user devices or sending devices operating on an associated network. These source attributes may be a list of MAC (source) addresses for the end user devices or sending devices, or may include any number of other attributes for classifying packets being processed in a network switch or other network device. The table 400 associates the source attributes with a first class identifier (CLASS ID-1), which are listed in the right hand column. In this example, the source attributes are SRC-1 to SRC-M and SRC-101 to SRC-Q. For this example, it will be assumed that M equal 75 and that Q equals 250.

As illustrated in FIG. 4A, packets with source attributes in the range of SRC-L to SRC-M correspond with a user class A. As also shown in FIG. 4A, packets with source attributes in the range of SRC-101 to SRC-Q correspond with a user class B. Accordingly, there are 75 users in user class A and 150 users in user class B.

The table 410 illustrated in FIG. 4B may be used for assigning a classification designator, such as in the fashion described above. The table 410 includes, in the left column, destination attributes for two servers operating on an associated network. These destination attributes may be a list of MAC (destination) addresses for the servers, or may include any number of other attributes for classifying packets being processed in a network switch or other network device. The table 410 associates the destination attributes with second class identifiers (CLASS ID-2), which are listed in the right hand column. In this example, the destination attributes are DST-1 and DST-2 (only two servers are listed for purposes of clarity).

As illustrated in FIG. 4B, packets with destination attributes of DST-1 correspond with a destination class C. As also shown in FIG. 4B, packets with source attributes of DST-2 correspond with a destination class D. The lookup tables in FIGS. 4A and 4B may be used to respectively assign a first classification designator and a second classification designator, such as has been discussed above with respect to FIGS. 1-3.

The table 420 in FIG. 4C may be used for classification lookup after the first and second classification designators are assigned using the tables 400 and 410, respectively. The table 410 includes, in its left column, first classification designators (e.g., user class) and, in its center column, second classification designators (e.g., server class). The table 420 also includes, in its right column, the action (rule) to be applied to packets meeting the criteria in the left and center columns of the corresponding row. For instance, for user class A and destination class C, packets are allowed to continue to their destination, while packets with user class A and destination class D are dropped. As also illustrated in FIG. 4C, packets designated with user class B and destination class C are rerouted, such as to a network administration server, while packets with user class B and destination class D are allowed to continue to their destination. These actions are given by way of example and any number of other action is possible.

By way of comparison, were this simple set of rules to be applied for the 225 users of user classes A and B for destination classes C and D using a single stage classifier, 450 lookup table (CAM) entries would be used. That number is reduced by nearly 50 percent using the multistage classification techniques described herein. The number of lookup table entries using such techniques would be M+N+2+4=75+150+2+4=231, where M is the number of users in user class A, N is the number of users in user class B, there are 2 servers (DST-1 and DST-2) and four rules. As the number of sources, destinations and/or rules increase, the overall reduction (percentage) of lookup table entries will also increase.

The table 430 in FIG. 4D may be used to implement rule exceptions in a multistage classification system, such as has been previously described. The table 430 includes in its left column a source attribute, in its middle column a destination class and in its right column a rule exception. For the table 430, the rule exception is for packets from the end user device with the source attribute of SRC-1 with a destination class D. The rule exception is to allow such packets to continue to their destination. Without this rule exception, such packets would be dropped in accordance with the rule in the second row of the table 420, which indicates that packets with user class A (i.e., SRC-1) and destination class B are to be dropped. As was discussed above, the lookup table 430 may be implemented in conjunction with the classification lookup and/or the second stage lookup (e.g., the forwarding lookup in the switches 205 and 305). Again, implementing such an exception may be accomplished using a single rule, rather than multiple rules, such as in a single stage classifier.

Figure 5:
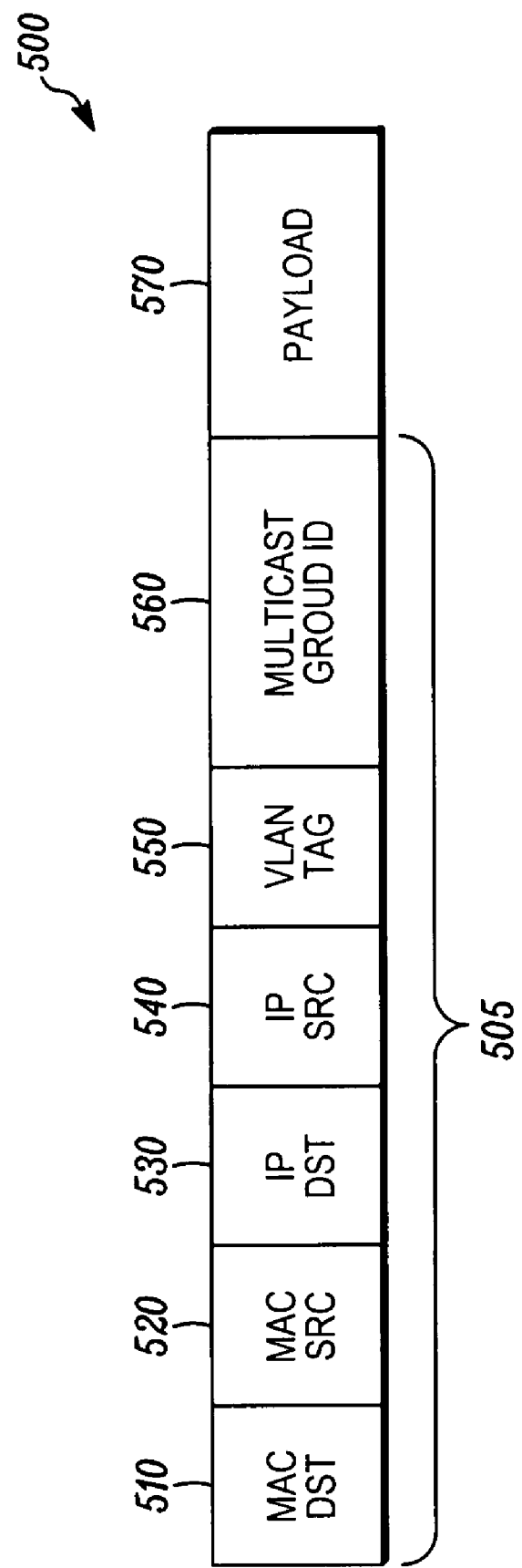
FIG. 5 is a diagram illustrating an example packet that may be processed in the network of FIG. 1.

FIG. 5 is a diagram that illustrates an example data packet 500 that may be processed in the network of FIG. 1, the switch 205 of FIG. 2, and/or the switch 305 of FIG. 3. The data packet 500 may be, for example, an Ethernet packet, although a variety of different data packet formats may be used. The data packet 500 includes a header 505 that contains a MAC destination address field 510, a MAC source address field 520, an IP destination address field 530, an IP source address field 540, a VLAN tag field 550, and a Multicast Group ID field 560. The packet 500 also includes a data payload field 570. Depending on the particular embodiment, other fields may be included in the packet 500, or fields may be eliminated. Also, depending on the particular situation, not all fields in the packet 500 may include valid information. As was described above, a parser may be used in a network device (e.g., a packet switch) to separate the packet 500 into its constituent parts prior to multistage classification being performed, such as in any of the manners described above.

Figure 6:
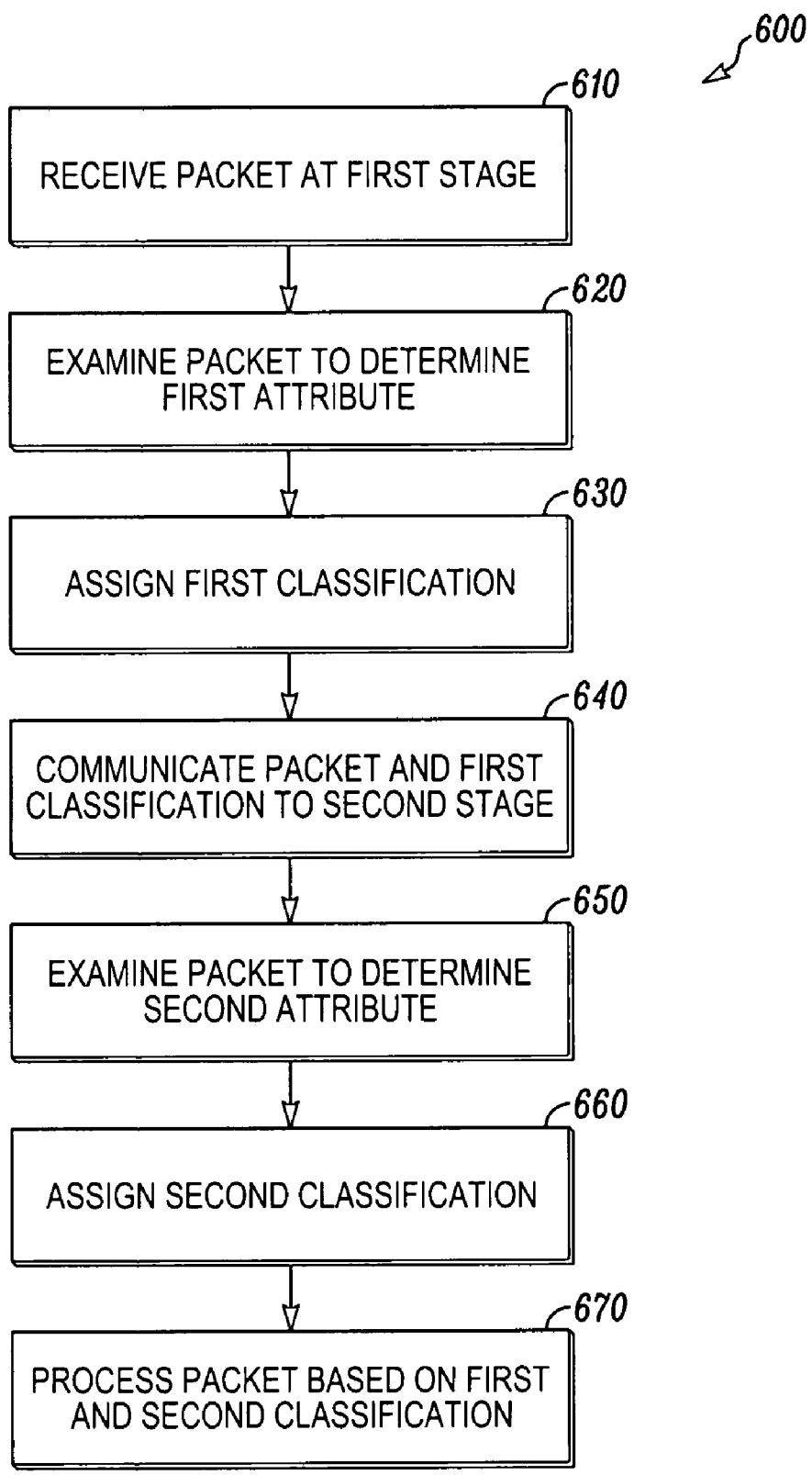
FIG. 6 is a flowchart illustrating an example method of packet processing using multistage classification.

FIG. 6 is a flow chart illustrating an example embodiment of a method 600 for processing packets using multistage classification. The method 600 includes, at block 610, receiving a data packet at a first processing stage, such as from a data network as shown in FIG. 1. At block 620, the method 600 includes examining the packet at the first processing stage to determine a first attribute of the packet, such as a MAC source address, for example. At block 630, the method 600 further includes assigning a first classification (e.g., a user classification) to the data packet based on the first attribute, such as using the lookup table 400 of FIG. 4A. The method 600, at block 640, further includes communicating the packet and the first classification to a second processing stage. The packet may be communicated to the second processing stage from the first processing stage or, alternatively, directly from the data network (e.g., via a parser). At block 650, the method 600 further includes examining the packet at the second processing stage to determine a second attribute of the packet, such as a MAC destination address. At block 660, the method 600 still further includes assigning a second classification (e.g., a destination classification) based on the second attribute, such as by using the lookup table 410 of FIG. 4B. Additionally, the method 600, at block 670, includes processing the packet based on the first classification and the second classification, such as using a classification lookup table, as was described above with respect to FIG. 4C, for example. Such an approach may be implemented using any number of classification stages.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
   receiving a data packet, in parallel, at a first processing stage and a second processing stage;
   examining the packet at the first processing stage to determine a first attribute of the packet in conjunction with performing a virtual domain assignment for the packet;
   assigning, by the first processing stage, a first classification to the data packet based on the first attribute;
   communicating the first classification from the first processing stage to the second processing stage;
   examining the packet at the second processing stage to determine a second attribute of the packet in conjunction with performing a forwarding lookup for the packet;
   assigning, by the second processing stage, a second classification to the data packet based on the second attribute; and
   processing, by the second processing stage, the packet based on the virtual domain assignment, the forwarding lookup, the first classification and the second classification.

2. The method of claim 1, wherein examining the packet at the first processing stage and the second processing stage comprises examining an Ethernet header of the packet.

3. The method of claim 1, wherein the first attribute and the second attribute each are selected from the group consisting of an identification of a port on which the packet was received, an Ethernet Media Access Controller (MAC) source address, an Ethernet MAC destination address, an Internet Protocol (IP) source address, an IP destination address, a Virtual LAN tag, and a Multicast Group Identifier.

4. The method of claim 1, wherein processing the packet based on the first classification and the second classification comprises at least one of communicating the packet to a destination address included in the packet, dropping the packet, and communicating the packet to an address other than the destination address.

5. The method of claim 1, wherein the first processing stage and the second processing stage each comprise a lookup table associating the first attribute and the second attribute, respectively, with the first classification and the second classification.

6. The method of claim 1, wherein the first processing stage and the second processing stage each comprises a content-addressable memory (CAM) storing a lookup table, the CAM of the first stage associating the first attribute with the first classification, and the CAM of the second stage associating the second attribute with the second classification.

7. The method of claim 1, wherein receiving the packet comprises receiving the packet from an end user device in a data network.

8. The method of claim 1, further comprising:
   communicating the packet to a third processing stage;
   examining the packet at the third processing stage to determine a third attribute of the packet;
   assigning a third classification based on the third attribute; and
   processing the packet based on the first classification, the second classification and the third classification.

9. The method of claim 1, wherein:
   the first classification identifies a first group of users in a data network;
   the second classification identifies an intended destination for the packet; and
   the method further comprises:
   implementing a set of packet processing rules for processing the packet based on the first classification and the second classification.

10. The method of claim 9, wherein the set of packet processing rules includes one or more exceptions for a particular user of the first group of users, such that one or more rules of the set of packet processing rules are not applied to data packets associated with the particular user.

11. The method of claim 1, wherein processing the packet based on the first classification and the second classification comprises processing the packet in accordance with a set of packet processing rules implemented in the second processing stage.

12. A data network node comprising:
   a first packet processing stage; and
   a second packet processing stage operatively coupled with the first processing stage,
   wherein the first processing stage is configured to:
   receive a data packet from a data network;
   determine a virtual domain assignment for the packet;
   examine the packet to determine a first attribute of the packet;

assign a first classification based on the first attribute; and communicate the first classification to the second processing stage, and wherein the second processing stage is configured to:

receive the packet from the data network in parallel with the first processing stage;

receive the first classification from the first processing stage;

perform a forwarding lookup for the packet;

examine the packet to determine a second attribute of the packet;

assign a second classification based on the second attribute; and process the packet based on the virtual domain assignment, the forwarding lookup, the first classification and the second classification.

13. The data network node of claim 12, wherein the first processing stage comprises a content-addressable memory implementing a lookup table associating the first attribute with the first classification.

14. The data network node of claim 12, wherein the second processing stage comprises a content-addressable memory implementing a lookup table associating the second attribute with the second classification.

15. The data network node of claim 12, wherein the second processing stage is further configured to implement a set of packet processing rules for processing the packet based on the first classification and the second classification.

16. The data network node of claim 15, wherein the set of packet processing rules includes at least one exception, for one or more particular users of the data network, to one or more rules of the set.

17. The data network node of claim 12, wherein the second processing stage is further configured to, when processing the packet, carry out one of communicating the packet to a destination address included in the packet, dropping the packet, and communicating the packet to an address other than the destination address.

18. An Ethernet data packet switch comprising:

a first packet processing stage including a first content-addressable memory (CAM) implementing a first lookup table, the first lookup table associating a first set of packet attributes with a first set of respective classes; and a second packet processing stage including a second CAM implementing a second lookup table, the second lookup table associating a second set of packet attributes with a second set of respective classes, wherein the first processing stage is configured to:

receive a data packet from a data network;

determine a virtual domain assignment for the packet;

examine the packet to determine a first attribute of the packet, the first attribute being one of the first set of packet attributes;

assign a first classification from the first set of classes based on the first attribute; and communicate the first classification to the second processing stage; and wherein the second processing stage is configured to:

receive, in parallel with the first processing stage, the packet from the data network;

receive the first classification from the first processing stage;

perform a forwarding lookup for the packet examine the packet to determine a second attribute of the packet, the second attribute being one of the second set of packet attributes;

assign a second classification based on the second attribute; and process the packet based on the virtual domain assignment, the forwarding lookup, the first classification, the second classification and a set of packet processing rules.

19. The Ethernet switch of claim 18, wherein the first and second CAMs comprise ternary CAMs.

20. The Ethernet switch of claim 18, wherein the second processing stage is further configured to, based on the virtual domain assignment, the forwarding lookup, the first classification, the second classification and a set of packet processing rules;

carry out one of communicating the packet to a destination address included in the packet, dropping the packet, and communicating the packet to an address other than the destination address.

* * * * *

UNITED STATES PATENT AND TRADEMARK OFFICE
CERTIFICATE OF CORRECTION

| | | |
|---|---|---|
| PATENT NO. | : 7,813,337 B2 | Page 1 of 1 |
| APPLICATION NO. | : 11/711984 | |
| DATED | : October 12, 2010 | |
| INVENTOR(S) | : Bora Akyol et al. | |

It is certified that error appears in the above-identified patent and that said Letters Patent is hereby corrected as shown below:

In the Claims:

In column 14, line 23, in claim 18, delete "packet" and insert -- packet; --, therefor.

In column 14, line 35-43, in claim 20, delete "20. The Ethernet switch of claim 18, wherein the second processing stage is further configured to, based on the virtual domain assignment, the forwarding lookup, the first classification, the second classification and a set of packet processing rules;
carry out one of communicating the packet to a destination address included in the packet, dropping the packet, and communicating the packet to an address other than the destination address." and insert -- 20. The Ethernet switch of claim 18, wherein the second processing stage is further configured to, based on the virtual domain assignment, the forwarding lookup, the first classification, the second classification and a set of packet processing rules; carry out one of communicating the packet to a destination address included in the packet, dropping the packet, and communicating the packet to an address other than the destination address. --, therefor.

Signed and Sealed this
Fourth Day of January, 2011

David J. Kappos
*Director of the United States Patent and Trademark Office*